3,227,212
TEMPORARY PLUGGING AGENT
Harold N. Black and Leonard L. Melton, both of Duncan, Okla., assignors to Halliburton Company, Duncan, Okla., a corporation of Delaware
No Drawing. Filed June 19, 1961, Ser. No. 117,809
2 Claims. (Cl. 166—22)

The present invention relates to a new and improved composition for a temporary plug in a well and a method of using same.

The present invention is particularly related to a temporary plug formed by adding a borate compound to a water gelled fluid for the purpose of fracturing several formations in a well without the necessity of resetting the packer, for plugging one formation in the well while testing or completing another, for temporarily sealing a thief zone or a water zone, for sealing a channel leak between two or more formations and for use in other well operations wherein it is desired to plug or seal a formation or area.

It is therefore an important object of the present invention to provide a new and improved composition which upon setting forms a solid plug which may be broken down when desired, either externally or internally.

One of the principal objects of this invention is to provide a new and improved plugging agent for well operations wherein the plugging agent may be introduced into the well while continuing normal injection operations.

Another object of the present invention is to provide a new and improved composition wherein a borate compound is added to a water gelled fluid comprising a finely powdered water soluble gum or galactomannan, which composition upon setting a predetermined time forms a solid compound or plugging material and which material may be quickly and easily broken down either externally by the addition of pre-selected chemicals or internally by the addition of a breaker or breaking agent.

Still another object of the present invention is to provide a new and improved temporary plugging agent which can be handled quickly and easily with safety and which is economical to use.

Still another object of the present invention is to provide a new and improved method for fracturing well formations, for temporarily plugging a well formation, for temporarily sealing a thief zone, water zone, or other zone, and/or for sealing or plugging a channel leak between two or more formations.

A further object of the present invention is to porvide a new and improved composition for use as a temporary plugging agent comprising the addition of sodium borate, sodium tetraborate, borax or the like with a water gelled fluid wherein the gelling agent is a water soluble gum such as a guar gum or the like.

Still a further object of the present invention is to provide a new and improved temporary plugging agent to which a chemical breaker may be added thereto prior to setting of the plugging agent whereby the temporary plug thus formed breaks up internally at a predetermined desired time.

Yet a further object of the present invention is to provide a new and improved temporary plugging agent to which acid may be added thereto after setting of the plugging agent whereby said temporary plug is broken up externally when desired.

Another object of the present invention is to provide a new and improved composition for use as a temporary plugging agent comprising the addition of a borate compound and caustic to a water gelled fluid employing a water soluble gum as the gelling agent, and a method of using such composition.

Other objects and advantages of the present invention will be readily apparent from a reading of the following specification:

In conducting various types of well operations, such as fracturing earthen formations within the well, plugging one well formation while testing another, sealing a thief zone, water zone, or other zones as desired, and/or sealing a channel leak between two or more formations, it is sometimes desired that such plugging, sealing, etc., be of a temporary nature. The plugging agent must therefore not only fulfill the job of forming a solid plug, but it must form a plug which can be quickly and easily removed. The present invention provides a new and improved composition and method which effectively accomplishes this.

The temporary plugging agent is prepared by adding a solid borate compound such as sodium borate, sodium tetraborate, borax or any other suitable borate compound to a water gelled fluid. The water gelled fluid is originally prepared by adding a finely powdered galactomannan such as guar gum to either fresh or salt water.

Although the composition of the present invention is particularly useful in well operations, it may of course be used in other operations wherein a temporary plugging agent or plugging material is desired.

After the borate compound and the water gelled fluid have been mixed together, a delayed solidifying reaction occurs. The time of the reaction may be primarily controlled by the amount and the particle size of the borate compound added to the water gel and the temperature of the well formation into or adjacent which the plugging agent or composition is to be introduced.

The speed of the reaction may be increased by adding more borate compound and the speed of the reaction may be decreased by increasing the particle size of the borate compound. The coarser the borate grain used, the longer the reaction time. By varying the amounts and particle sizes of the borate compound, the reaction of the borate with the water gel may be controlled whereby the mixture sets up or forms a rubbery jelly-like mass after any desired time up to approximately about one-half hour.

This variable and controllable reaction time allows the plugging material to be readily and easily incorporated in well injection operations and enables such operations to be continuously run thereby resulting in considerable saving of time and materials.

Normally the water gel and the borate compound are mixed together or combined at the well site or well head and then introduced or pumped into the well in the desired formation or area, such as a fracture, thief zone, water zone, channel leak, or any other desired area of the well. After the composition has been placed in the desired area, at a predetermined time, the reaction occurs and the liquid or fluid becomes a rubbery jelly-like mass which enters and plugs the pores of the formation or area.

The plug thus formed above may be removed by introducing an acid, such as hydrochloric or any other suitable acid, into the well adjacent or in the plug or plugging composition. The acid reacts with the plugging material, causing it to thin to its original consistency and eventually to the approximate consistency of the water used to form the water gelled fluid. The breaking time of this reaction is highly dependent upon the amount of the acid used and the temperature of the well hole at the plugged area.

Although the borate-water gel composition may be broken up externally as stated above, it may also be desirable to break up such temporary plug internally. This is easily accomplished by adding a breaker, such as a halogenated hydrocarbon, to the plugging material prior to introducing the composition into the well hole. By varying the amount of the breaker, the breakup time can easily be predetermined. A breaker of this type produces acid upon hydrolysis, and hydrolysis may be accomplished through fluids already in the well and in contact with the plugging agent, or water or other aqueous liquids may be introduced into the well in the plugged zone for producing similar hydrolysis. The acid formed by such hydrolysis acts upon the plug in a similar manner as acid introduced from an external source and thus removes the plug by thinning its consistency as stated hereinabove. A halogenated hydrocarbon, such as benzo trichloride, benzylidene chloride and benzyl chloride, has been found to be especially useful. Any other suitable breaker may be used without departing from the scope of the invention. In this respect, ethyl acetate has also been successfully used as a breaker.

Although the composition described above has been successfully tested, there is some evidence of lumping in certain instances. This lumping can be substantially prevented or inhibited by the addition of a base, such as caustic or other similar material, in either liquid or solid form to the water gel either prior to or simultaneously to adding the borate compound. Sodium hydroxide, potassium hydroxide and ammonium hydroxide may be employed as well as any other suitable hydroxide.

For some types of well operations, particularly those where it is necessary to plug rather large fractures or voids, the addition of a bridging material may be desired. Rock salt has been found to be useful in this respect.

The composition and method of the present invention has been actually field tested in an oil well. A channel between the upper and lower formations and/or a thief zone had caused the loss of fluid circulation. The formation pressure of the upper zone was 4700 p.s.i. and that of lower zone was 1700 p.s.i. Temperatures of the zones exceeded 200° F.

The problem of course was to temporarily plug the channel leak or thief zone. On order to accomplish this, 125 pounds of guar gum, 10 pounds of dry caustic or sodium hydroxide and 5 pounds of sodium tetraborate were mixed with 1000 gallons of saturated brine. This solution or composition was pumped into the desired area at a pump rate of approximately 2 to 5 barrels per minute. The full 1,000 gallons of the plugging material did not prove to be necessary to complete the job. The job was very successful.

The field test as well as laboratory tests indicate that the plugging agent or material of this invention is particularly desirable and effective when formation pressures of 5000 p.s.i. or less exist and the formation temperatures do not exceed 200° F. The pressure and temperature above represent the optimum conditions for the use of the present invention and no limitation of the invention is intended thereby.

Some examples of laboratory tests are as follows:

*Example 1*

Preliminary tests were conducted using Guartec F (a commercial grade of guar gum flour) in concentration of 1%, 2% and 3% by weight in water to form a gel. Since a 1% concentration of the sample formed a satisfactory gel with water, the remaining tests were conducted using a 1% concentration of the sample, except as noted in the data.

Additional tests were conducted using gels formed with 1% of the submitted sample gelled in water. Several chemicals at varied concentrations were added to gels in tests to obtain variable consistencies and break times for the diverting agents. A sample containing 250 ml. of water gel was mixed for each test. Sodium borate or sodium tetraborate was added in various concentrations to most of the test samples for the purpose of forming a rubbery gel. Sodium hydroxide was added to reduce lumping and smooth the gel. Trichlorotoluene was added in some of the tests for a breaker.

The general mixing procedure for most of these tests was as follows:

After adding 1% by weight of sample in 250 ml. of water, the mixture was vigorously agitated with a paddle type air mixer for approximately twenty minutes. When a satisfactory gel had formed, a breaker, trichlorotoluene (when used), was slowly added in the desired concentration while continuously agitating the water gel with a mixer. A 50–50 blend of dry caustic or sodium hydroxide and sodium borate or sodium tetraborate was added to the gel with continuous agitation until a rubbery, jelly-like mass had formed. Times required for formation of this rubbery gel usually varied from five to twelve minutes.

Breaking times were observed and recorded for each test at various selected temperatures. Data from these tests was tabulated as follows:

| Test No. | Percent sodium borate or sodium tetraborate | Percent caustic or sodium hydroxide | Percent breaker | Other additive | pH | Break time |
|---|---|---|---|---|---|---|
| 1 | 0.1% borate | None | None | None | | 5 days at 80° F., 5 days at 180° F. |
| 2 | Excess | None | None | do | | 7 days at 80° F., 7 days at 180° F. |
| 3 | 0.1% borate | None | None | 0.05% formaldehyde | | 23 days at 80° F., 10 days at 180° F. |
| 4 | do | None | None | None | 7.5 | 2 days at 80° F., 7 days at 180° F. |
| 5 | do | None | 0.5 | do | 3.0 | 1 day at 80° F., 4 days at 180° F. |
| 6 | None | None | None | 0.05% formaldehyde | 5.5 | 3 days at 80° F., 6 days at 180° F. |
| 7 | 0.05% borate | None | 0.05 | None | 6.5 | 5 days at 80° F., 4 hrs. at 180° F. |
| 8 | 0.01% borate | None | 0.01 | 0.01% formaldehyde | 6.5 | 5 days at 80° F., 1 day at 180° F. |
| 9 | 0.03% borate | None | 0.01 | None | 6.5 | 2 days at 80° F., 1 day at 180° F. |
| 10 | 0.05% borate | None | 0.01 | do | 7.5 | 2 days at 80° F., 1 day at 180° F. |
| 11 | do | None | 0.01 | 0.4% monosodium phosphate | 8.0 | 3 days at 80° F., 1 day at 180° F. |
| 12 | do | Excess | 0.01 | do | 8.0 | 1 day at 180° F. |
| 13 | 0.03% borate | 0.08 | 0.01 | do | 8.0 | 2 days at 120° F., 1 day at 180° F. |
| 14 | 0.02% borate | 0.08 | 0.01 | do | 8.0 | 2 days at 120° F., 1 day at 180° F. |
| 15 [1] | 0.05% sodium borate or sodium tetraborate | 0.05 | None | None | 10.0 | Over 24 hrs. at 80° F. |
| 16 [1] | do | 0.05 | 0.03 | do | 10.0 | Over 24 hrs. at 180° F. |
| 17 | do | 0.05 | None | do | 10.0 | Over 24 hrs. at 180° F. |
| 18 | do | 0.05 | 0.01 | do | 10.0 | Over 24 hrs. at 180° F. |

[1] Did not rubberize. Used 0.5% Guartec F instead of 1.0% in these tests.

When finely powdered sodium borate was added to the gel, the reaction occurred in less than one minute. As the rubberized gel was considered to be too viscous to pump, it was desirable to delay this reaction for at least five minutes. Such time delay is required in the field to allow the fluid to reach the well head or formation before the congealing action occurs. Should the congealing occur before the fluid passed through the pumps, the gel would probably stall the pumps and prevent satisfactory completion of the particular well operation. To increase the time required to form the rubbery mass, a coarser grain sodium borate was used rather than a powdered sodium borate. The use of the coarser grained sodium borate caused some lumping in the gel, but did delay the reaction from about five to about twelve minutes depending upon the concentration used. This lumping effect was substantially reduced by the addition of 0.05% sodium hydroxide or caustic blended dry with 0.05% sodium borate or tetraborate by weight.

A breaker, although not absolutely necessary, is usually preferable. In such a case breaker such as trichlorotoluene or benzo trichloride has been found to be particularly successful. It should be noted however that this breaker should not be added until the water gel has formed.

Breaking times for these tests were determined to be very sensitive and were controllable within a desired range. The break time may be varied or controlled by the amounts of sodium borate or sodium hydroxide added, the temperature, amount of the breaker itself, amount of guar gum added, preservative, and the pH of the system.

*Example II*

Numerous tests were conducted using gels formed by addition of 1% by weight of guar gum to either fresh or salt water. A sample containing 250 ml. of gelled water was mixed for each test. Several chemicals at varied concentrations were added to the gels in different tests to obtain variable consistencies and breaking times for the diverting agents. Sodium tetraborate was added in varied amounts in these tests for the purpose of forming a rubbery gel. Caustic (sodium hydroxide) was either blended dry with the sodium tetraborate or added as a liquor prior to adding the sodium tetraborate to prevent lumping and smooth the gel.

The general mixing procedure followed in these tests was as follows:

After adding 1% by weight of finely powdered guar gum to 250 ml. of water, the mixture was agitated with a paddle type air mixer for approximately twenty minutes. After a satisfactory gel had formed, trichlorotoluene, when a breaker was used, was added in the desired concentration while continuously agitating the gel with the mixer. Sodium hydroxide and sodium tetraborate were added to the gel while using continuous agitation until a rubbery, jelly-like mass had formed. The time for the formation of the rubbery gel usually varied from about five to about twelve minutes. Breaking times were observed and recorded for each test at various selected temperatures.

TESTS USING SODIUM HYDROXIDE AND SODIUM TETRABORATE BLENDED DRY (50-50 WEIGHT)

| Test No. | Percent breaker | Percent caustic and borate | Description of diverting agent | Set up time in minutes | Final pH | Break time in hours |
|---|---|---|---|---|---|---|
| 1 | 0.2 | 0.1 | Good (rubbery) | 5 | 10 | >24 hrs. |
| 2 | 0 | 0.1 | ---do--- | 5 | 10 | >24 hrs. |
| 3[1] | 0.2 | 0.2 | Not rubbery | 20 | 8 | >24 hrs. |
| 4[1] | 0 | 0.2 | ---do--- | 20 | 8 | >24 hrs. |
| 5[2] | 0.2 | 0.1 | Lumpy and rubbery. | 10 | 8 | <24 hrs. |
| 6[2] | 0 | 0.1 | ---do--- | 10 | 8 | >24 hrs. |
| 7 | 0.06 | 0.1 | ---do--- | 1 | 7.5 | 3 hrs. at 180° F. |
| 8[2] | 0.06 | 0.1 | Good | 5 | 9 | 5 hrs. at 180° F. |
| 9[3] | 0.08 | 0.1 | ---do--- | 1 | 10 | 1.5 hrs. at 180° F. |
| 10 | 0.08 | 0.1 | ---do--- | 1 | 9 | 1.5 hrs. at 180° F. |
| 11 | 0.06 | 0.01 | Lumpy and rubbery. | 1 | | 1 hr. at 180° F. |
| 12 | 0.06 | 0.03 | Good | 1 | | 1 hr. at 180° F. |

TESTS ADDING LIQUID CAUSTIC BEFORE ADDING SODIUM TETRABORATE

| Test No. | Percent breaker | Percent caustic and borate | Description of diverting agent | Set up time in minutes | Final pH | Break time in hours |
|---|---|---|---|---|---|---|
| 13 | 0.05 | (C.) 0.05 (B.) 0.02 | Very good | 5-8 | 10 | 1½ at 180° F. |
| 14 | 0.05 | (C.) 0.05 (B.) 0.01 | ---do--- | 10-12 | 9 | 2 at 180° F. |

TESTS USING SODIUM HYDROXIDE AND SODIUM TETRABORATE BLENDED DRY (75-25 BY WEIGHT)

| Test No. | Percent breaker | Percent caustic and borate | Description of diverting agent | Set up time in minutes | Final pH | Break time in hours |
|---|---|---|---|---|---|---|
| 15 | 0.05 | 0.05 | Very good | 5-8 | 10 | 1 at 120° F. |
| 16 | 0.05 | 0.1 | Good | 10-15 | 10 | 2 at 120° F. |
| 17 | 0.03 | 0.05 | ---do--- | 10-15 | 10 | <36 hrs. |
| 18 | 0.03 | 0.1 | ---do--- | 10-12 | 10 | >36 hrs. |

[1] Added 0.4% monosodium phosphate before adding breaker, caustic and borate.
[2] Used salt water containing 10% salt by weight.
[3] Breaker added after adding caustic and borate. Gel appeared to rubberize before breaker had time to completely disperse in system.

*Example III*

*Procedure.* — Water gels were made using both 60 pounds of finely powdered guar gum per 1000 gallons of both fresh water and salt water containing 10% by weight of salt. The fluid gels were mixed 15 minutes in a paddle type air mixer, after which a breaker, benzo trichloride was added to the system. Mixing was continued while liquid caustic or sodium hydroxide (50-50 by weight) and a coarse grained borate were added in amounts of from 2½ to 25 pounds per 1000 gallons of water gel. After the liquid gels had formed a solid jelly-like mass, they were placed in temperature baths at various temperatures and breaking times were recorded.

| No. | Breaker | Caustic | Sodium borate | Time [1] (min.) | Description | Break time (hrs.) |
|---|---|---|---|---|---|---|
| 1 | 1 gal./1,000 g | 1 gal./1,000 g | 25 lbs./1,000 g | 3-5 | Lumpy | 24 at 140° F. |
| 2 | 1 gal./1,000 g | 1 gal./1,000 g | 25 lbs./1,000 g | 2-4 | do | Do. |
| 3 | ½ gal./1,000 g | 1 gal./1,000 g | 2½ lbs./1,000 g | 5-10 | Rubbery, smooth. | Do. |

[1] Time for gel to reach the viscous, rubbery stage.
1—salt water; 2 and—3 fresh water.

These tests indicated that the plugging agent or material (sodium borate and/or caustic) are preferably used in amounts of from about two to about five pounds per 1000 gallons of water gel. Higher concentrations of the sodium borate causes lumping and inhibits breaking back.

In one preferred embodiment of the invention, it is recommended that the sodium borate be added to the system after the gel has formed. The breaker should also not be added until the gel has formed and should preferably not exceed 1 gallon per 1000 gallons of gel. The caustic or sodium hydroxide is preferably added after the breaker and in an amount of about 1 gallon per 1000 gallons of gel. Dry caustic may be used in lieu of liquid caustic in which case about 2½ pounds per 1000 gallons of gel is recommended. The caustic may be added either before or with the sodium borate, borax or sodium tetraborate. A maximum of 5 pounds of sodium borate per 100 gallons of gel is also recommended.

*Example IV*

*Procedure.* — Water gels were formed using varying concentrations of guar gum flour in a saturated brine and the consistencies of each were compared. Dry caustic (sodium hydroxide) and sodium borate were added to determine their effect on the gel.

| Guar gum concentration (lbs./1,000 gal.) | Caustic (lbs./1,000 gal.) | Sodium Borate (lbs./1,000 gal.) | |
|---|---|---|---|
| 80 | 5 | 5 | Extremely viscious gel. |
| 125 | 10 | 20 | Excess sodium borate. |

*Example V*

*Procedure.*—This was an actual field test. At the well site 80 pounds of guar gum flour was added per 1000 gallons of brine water in a suitable container, and the guar gum was completely solvated before any other materials were added. A breaker, benzo trichloride, was slowly added to the water gel while vigorously circulating such gel to insure complete mixing throughout the fluid. Caustic soda and sodium borate were added to the gel as it was pumped into the well. These latter materials are preferably added to the water gel after the chemical breaker has been dispersed throughout the gel.

| Test | Breaker, gal./1,000 gal. | Caustic, lbs./1,000 gal. | Sodium borate, number/1,000 gal. | Set up time (min.) | Break time (hr.) |
|---|---|---|---|---|---|
| 1 [1] | 0.75 | 5.0 | 2.5 | 5-10 | 12 at 120° F. |
| 2 [2] | 0.75 | 5.0 | 2.5 | 5-10 | 1 at 90° F. |
| 3 [3] | 0.75 | 5.0 | 2.5 | 10 | 4 at 90° F. |
| 4 [3] | 1.0 | 7.5 | 5.0 | 7 | 12 at 100° F. |
| 5 [3] | 1.0 | 5.0 | 5.0 | 10 | 6 at 100° F. |

[1] Water from well formation.
[2] Water from city water supply (Cement, Oklahoma).
[3] Water from another well formation.

In using the composition of the present invention as a temporary plugging agent for oil well operations, the materials used therein are transported to the well site by any suitable means and preferably separately. The water used may be obtained from the well itself or any other suitable source of supply and may be either fresh water or salt water.

A blender tank or other suitable container is set up at the well site and the water is placed therein. (For illustrative purposes only 1,000 gallons of water is used). While continuously agitating the water, from about 60 to about 125 pounds of finely powdered guar gum or other suitable water soluble gum is slowly added. This fluid is mixed until the guar gum has completely gelled the water. This normally takes less than a half hour, depending upon the amount of gum added.

In order to cause the plugging material to break up internally at a predetermined time, a chemical breaker, such as benzo trichloride, is added to the water gelled fluid. Any other suitable halogenated hydrocarbon may be used if desired. From about one-half gallon to about one gallon of such breaker has been determined to be successful. The breaker is slowly added to the gelled water while continuing blender agitation. The mixing is continued until the breaker is completely mixed through the gel. This mixing normally requires less than a half hour.

After the breaker has been added and thoroughly mixed, caustic or sodium hydroxide, either liquid or dry, and if dry a relatively coarse grain sodium borate, tetraborate or borax preferably in a 50-50 ratio by weight and in amounts of from about two to about twenty-five pounds are added to gel.

Substantially immediately thereafter the plugging agent thus formed is pumped into the well into or adjacent the formation or zone desired to be plugged or sealed. An injection rate of 30 barrels per minute has been found to be satisfactory. The composition then sets up within a relatively short predetermined time (up to about twenty minutes) and the formation is plugged. The plug remains in place until the chemical breaker therein operates in the manner explained hereinabove to break up the plug at a predetermined desired time.

In an actual field operation a pressure testing device was used while treating the well and the indication on the pressure chart of a "kick" for each zone of the well treated indicated that the plug was satisfactorily formed.

From the foregoing specification and examples, it can be appreciated that a new and novel temporary plugging agent has been developed which may be introduced into a well in a fluid state, form an effective plug or seal in the desired location after a predetermined setup or reaction time, and which may be afterward removed quickly and easily either internally (as is usually preferred) or externally.

Broadly, the invention relates to a new and improved composition or material and method of using same as a temporary plug or plugging agent in well operations or other desired operations.

What is claimed is:

1. A method of temporarily plugging or sealing a well formation, fracture, thief zone, water zone, channel leak or the like, comprising the steps of, introducing into a well in a predetermined area therein a fluid composition consisting essentially of a water gelled fluid, a solid borate compound selected from the group consisting of sodium borate, sodium tetraborate and borax, and a chemical breaker selected from the group consisting of benzo trichloride, benzylidene chloride and benzyl chloride, said water gelled fluid consisting essentially of water and from about one percent to about three percent by weight of water of a finely powdered water soluble gum of the galactomannan class to thereby form a gel, and said borate compound being in an amount of about ten percent by weight of said gum to delayedly react with the gel and form a rubbery jelly-like mass therewith, said fluid composition having a delayed solidifying action and thereby after a predetermined time forms a plug in said predetermined area, and after a predetermined time acid is produced upon the hydrolysis of said breaker in said plug and removes said plug from the area therein.

2. A method of temporarily plugging or sealing a well formation, fracture, thief zone, water zone, channel leak or the like, comprising the steps of introducing into a well in a predetermined area therein a fluid composition consisting essentially of a water gelled fluid a solid borate compound selected from the group consisting of sodium borate, sodium tetraborate and borax, a base selected from the group consisting of sodium hydroxide, potassium hydroxide and ammonium hydroxide, and a chemical breaker selected from the group consisting of benzo trichloride, benzylidene chloride and benzyl chloride, said water gelled fluid consisting essentially of water and from about one percent to about three percent by weight of water of a finely powdered water soluble gum of the galactomannan class to thereby form a gel, said borate compound being in an amount of about ten percent by weight of said gum to delayedly react with the gel and form a rubbery jelly-like mass therewith, and said base being in an amount of about ten percent by weight of said gum to substantially inhibit lumping of the gel, said fluid composition having a delayed solidifying action and thereby after a predetermined time forms a plug in said predetermined area, and after a predetermined time acid is produced upon the hydrolysis of said breaker in said plug and removes said plug from the area therein.

References Cited by the Examiner

UNITED STATES PATENTS

| | | | |
|---|---|---|---|
| 2,332,822 | 10/1943 | Williams | 166—30 |
| 2,624,679 | 1/1953 | Tschabold et al. | 106—208 |
| 2,681,704 | 6/1954 | Menaul | 166—32 |
| 3,058,909 | 10/1962 | Kern | 166—42 X |
| 3,079,332 | 2/1963 | Wyant | 252—8.5 |

OTHER REFERENCES

Smith et al.: The Chemistry of Plant Gums and Mucilages, pub. 1959 by Reinhold Pub. Corp., New York, pages 59, 60.

CHARLES E. O'CONNELL, *Primary Examiner.*

R. W. COLLINS, T. A. ZALENSKI, *Assistant Examiners.*